(12) United States Patent
Chuang (10) Patent No.: US 7,730,915 B2
(45) Date of Patent: Jun. 8, 2010

(54) ELEVATING DEVICE FOR THE WORKTABLE OF A MANUAL PLANER

(76) Inventor: Bor-Yann Chuang, No. 78, Yung Feng Rd., Taiping City, Taichung (TW) 411

( * ) Notice: Subject to any disclaimer, the term of this patent is extended or adjusted under 35 U.S.C. 154(b) by 229 days.

(21) Appl. No.: 11/838,249

(22) Filed: Aug. 14, 2007

(65) Prior Publication Data

US 2009/0044734 A1    Feb. 19, 2009

(51) Int. Cl.
  *B27C 5/02*    (2006.01)
  *B27C 1/00*    (2006.01)
(52) U.S. Cl. .................. 144/253.8; 144/253.1; 144/287
(58) Field of Classification Search ............. 144/253.1, 144/253.5–253.8, 114.1, 286.1–287
  See application file for complete search history.

(56) References Cited

U.S. PATENT DOCUMENTS

| | | | | |
|---|---|---|---|---|
| 2,872,957 A | * | 2/1959 | Eschenburg | 144/253.8 |
| 4,971,123 A | * | 11/1990 | Braunbach | 144/253.8 |
| 5,533,557 A | * | 7/1996 | Jedlicka et al. | 144/253.8 |
| 6,026,870 A | * | 2/2000 | Liu | 144/253.8 |
| 6,250,349 B1 | * | 6/2001 | Crofutt | 144/253.5 |
| 6,467,516 B1 | * | 10/2002 | Liao | 144/253.8 |
| 6,478,060 B1 | * | 11/2002 | Liao | 144/253.8 |
| 7,093,627 B2 | * | 8/2006 | Chuang | 144/253.8 |
| 7,198,082 B2 | * | 4/2007 | Chuang | 144/253.8 |
| 7,392,830 B2 | * | 7/2008 | Lei et al. | 144/253.8 |

* cited by examiner

*Primary Examiner*—Shelley Self
(74) *Attorney, Agent, or Firm*—Ming Chow; Sinorica, LLC (57) ABSTRACT

An elevating device for the worktable of a manual planer includes at least one base, one movable worktable and one elevating device. The elevating device comprises of a driving shaft, a driven shaft, a rotary base, a connecting rod base, a combining shaft and a spindle. When an operating member of the driving shaft is rotated, a driving gear of the driving shaft drives a first driven gear of the driven shaft to rotate, and a second driven gear of the driven shaft drives a third driven gear of the rotary base to rotate at the same time. Simultaneously, the rotary base is rotated to actuate the connecting rod base to operate, and the movable worktable positioned on the connecting rod base is moved upward or downward and is adjusted in its position.

8 Claims, 8 Drawing Sheets

ELEVATING DEVICE FOR THE WORKTABLE OF A MANUAL PLANER

BACKGROUND OF THE INVENTION

1. Field of the Invention

The present invention relates to a manual planer, particularly to one provided with an elevating which is a device simple in structure and able to be quickly and accurately adjusted for fixing the worktable in position.

2. Description of the Prior Art

A conventional planer is provided with an elevating device for adjusting the position of the worktable and so does the work piece on the worktable to be processed. The elevating device of the conventional planer comprises an elevating rod able to be actuated to move up and down for driving a support shaft to move and quickly adjust the position of the worktable of the planer. The elevating device comprises a micro-adjusting rod for carrying out micro-adjustment for the worktable. With this design of structure the elevating device of the conventional planer is able to carry out quick adjusting, micro-adjusting and positioning for the worktable of the planer. However, in adjusting the worktable, the elevating device has to carry out quick positioning first, and then micro-adjust and fixing the level of the worktable. Therefore, it is necessary to take much time to carry out such two-step adjusting and positioning. In addition, the elevating device is usually located under a movable worktable. users have to apply a lift force for carrying out adjusting of the movable worktable, this results in much inconvenience in the adjustment operation.

SUMMARY OF THE INVENTION

The objective of the present invention is to provide an elevating device for a worktable of a manual planer which includes a base, a movable worktable and an elevating device. The elevating device comprises of a driving shaft being actuated by an operating member, a driven shaft, a rotary base, a connecting rod base, an assembly rod and a spindle. When the operating member actuates the driving shaft to rotate, a driving gear formed on the driving shaft will drive a first driven gear of the driven shaft so as to rotate the driven shaft. A second driving gear formed on the driven shaft will drive a second driven gear formed on the rotary base so as to rotate the rotary base at the same time. When the rotary base is rotated relatively with the spindle serving as a pivot, the connecting rod base will be actuated to rotate, and the movable worktable positioned on the connecting rod base will be actuated to move upward or downward and adjusted in its position. The elevating device for the worktable of a manual planer of this invention is simple in structure and able to adjust the position of the worktable with only one step operation. In addition, the operating member of the driving shaft can be operated with less force and therefore convenient in use. Moreover, during carrying out adjusting of the planer, the elevating device of this invention can be quickly and accurately adjusted and fixed the worktable in position.

BRIEF DESCRIPTION OF DRAWINGS

This invention will be better understood with the detail description of the preferred embodiments with reference to the accompanying drawings, wherein.

DETAILED DESCRIPTION OF THE PREFERRED EMBODIMENT

Figure 1:
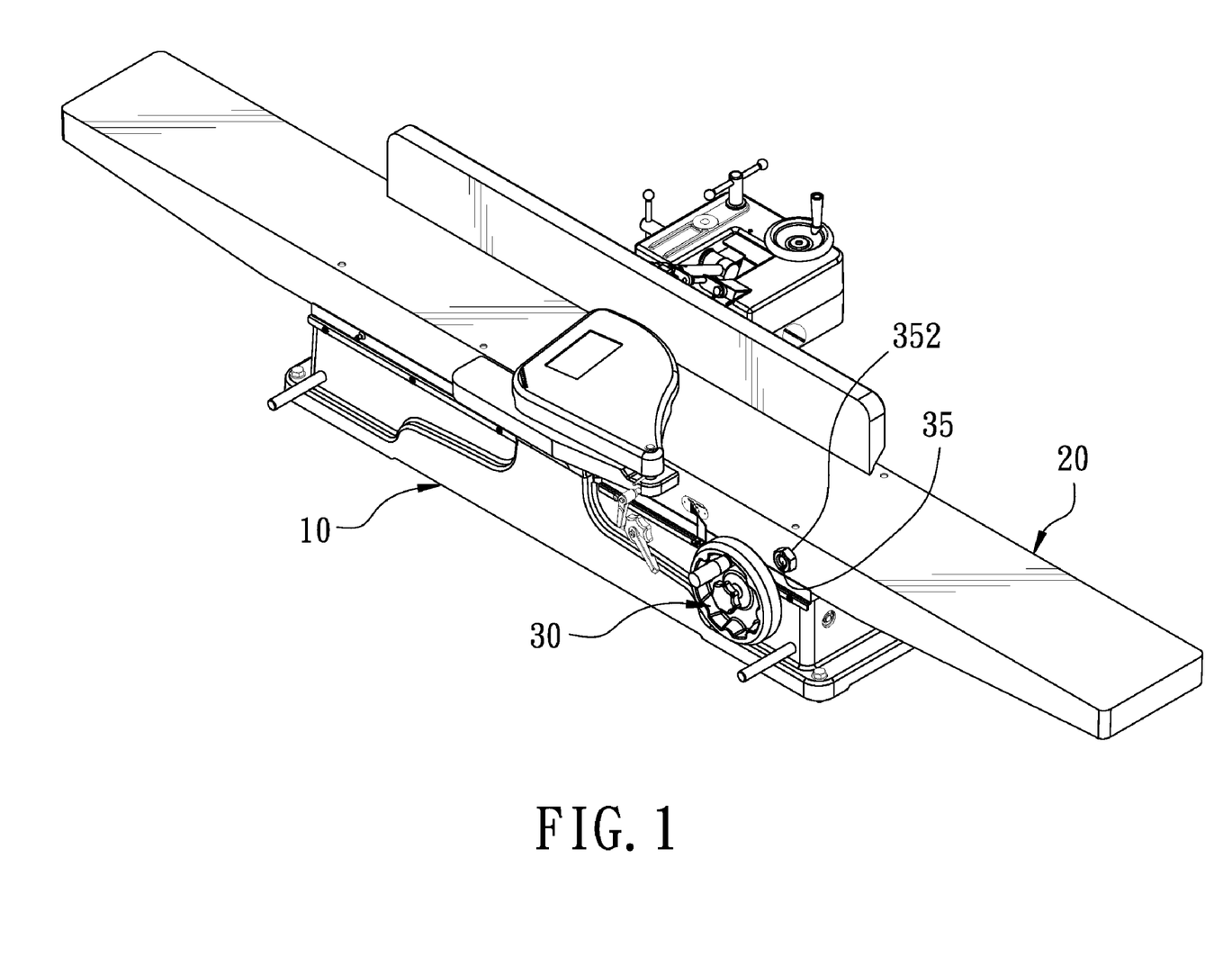
FIG. 1 is a perspective view of a first preferred embodiment of a manual planer in the present invention.
Figure 2:
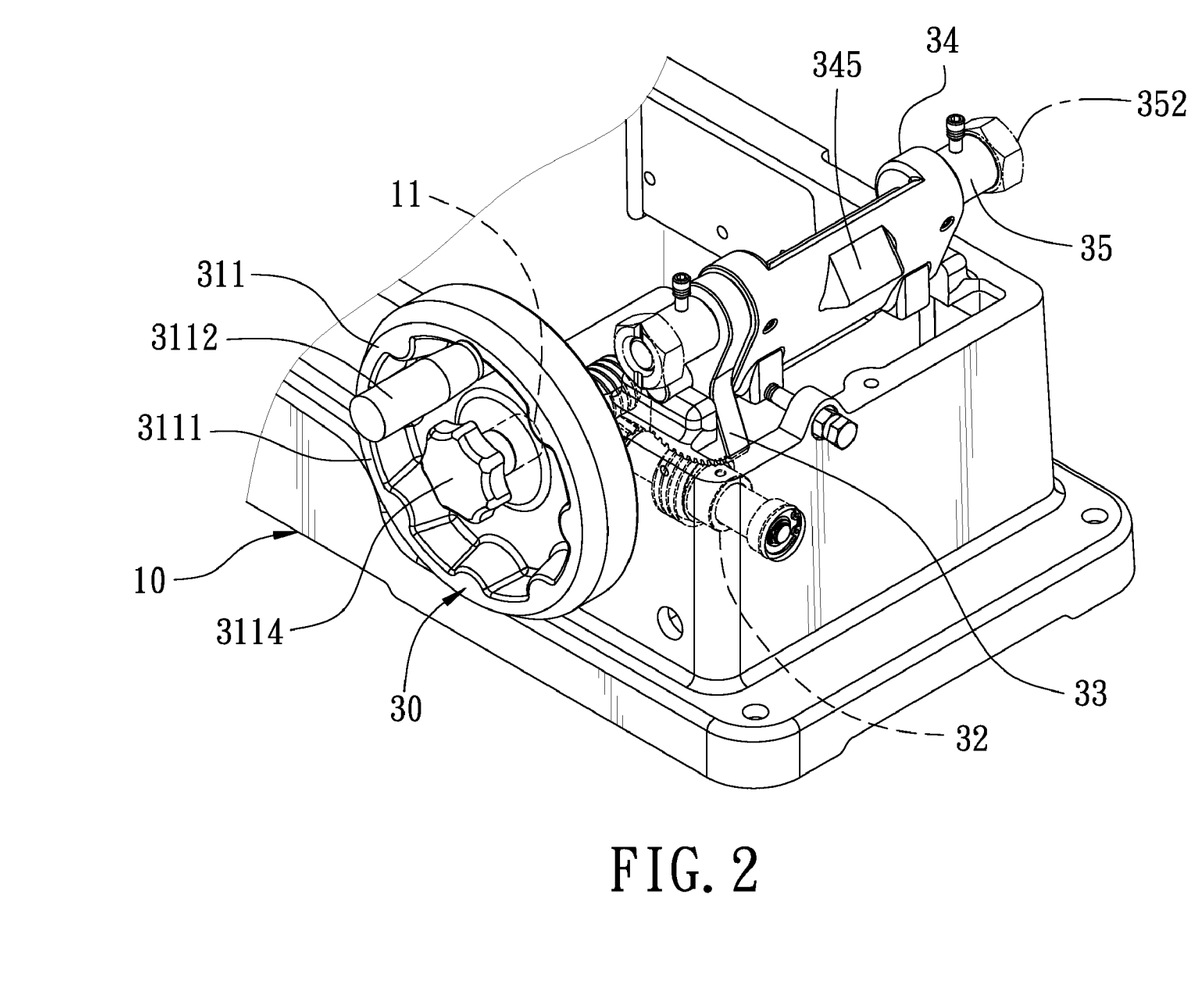
FIG. 2 is a perspective view of the first preferred embodiment of an elevating device for the worktable of the manual planer in the present invention.
Figure 3:
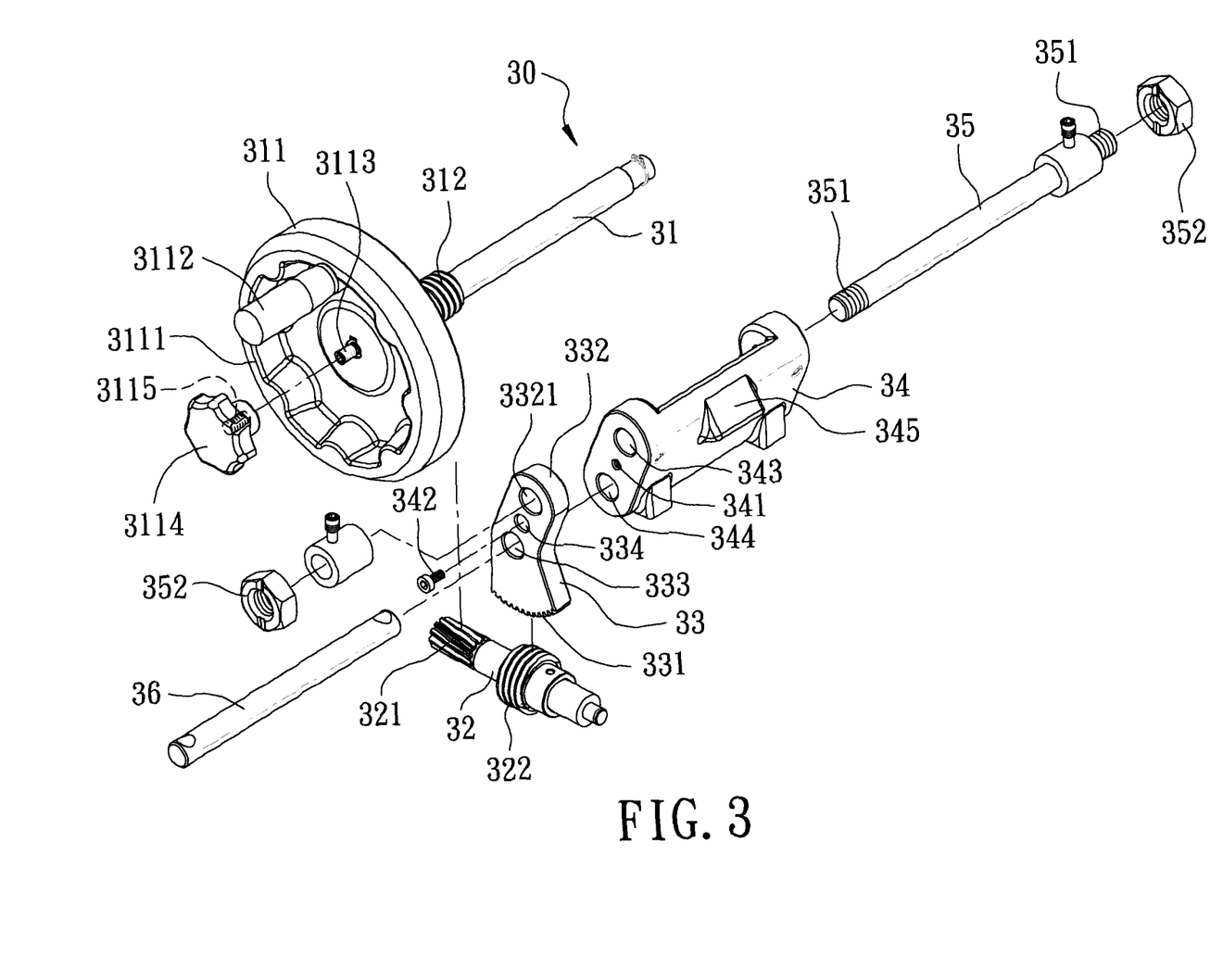
FIG. 3 is an exploded perspective view of the first preferred embodiment of the elevating device for the worktable of the manual planer in the present invention.

Referring to FIGS. 1, 2 and 3, a first preferred embodiment of an elevating device for the worktable of a manual planer which includes a base 10, a movable worktable 20 and an elevating device 30.

The base 10 being bored with a through insert hole 11 as shown in FIG. 2 which allows a driving shaft 31 to pass through.

The movable worktable 20 is slidably assembled at the end of the right side of the base 10.

Referring particularly to FIGS. 2 and 3, the elevating device 30 is composed of a driving shaft 31, a driven shaft 32, a rotary base 33, a connecting rod base 34, an assembly rod 35 and a spindle 36.

Figure 6:
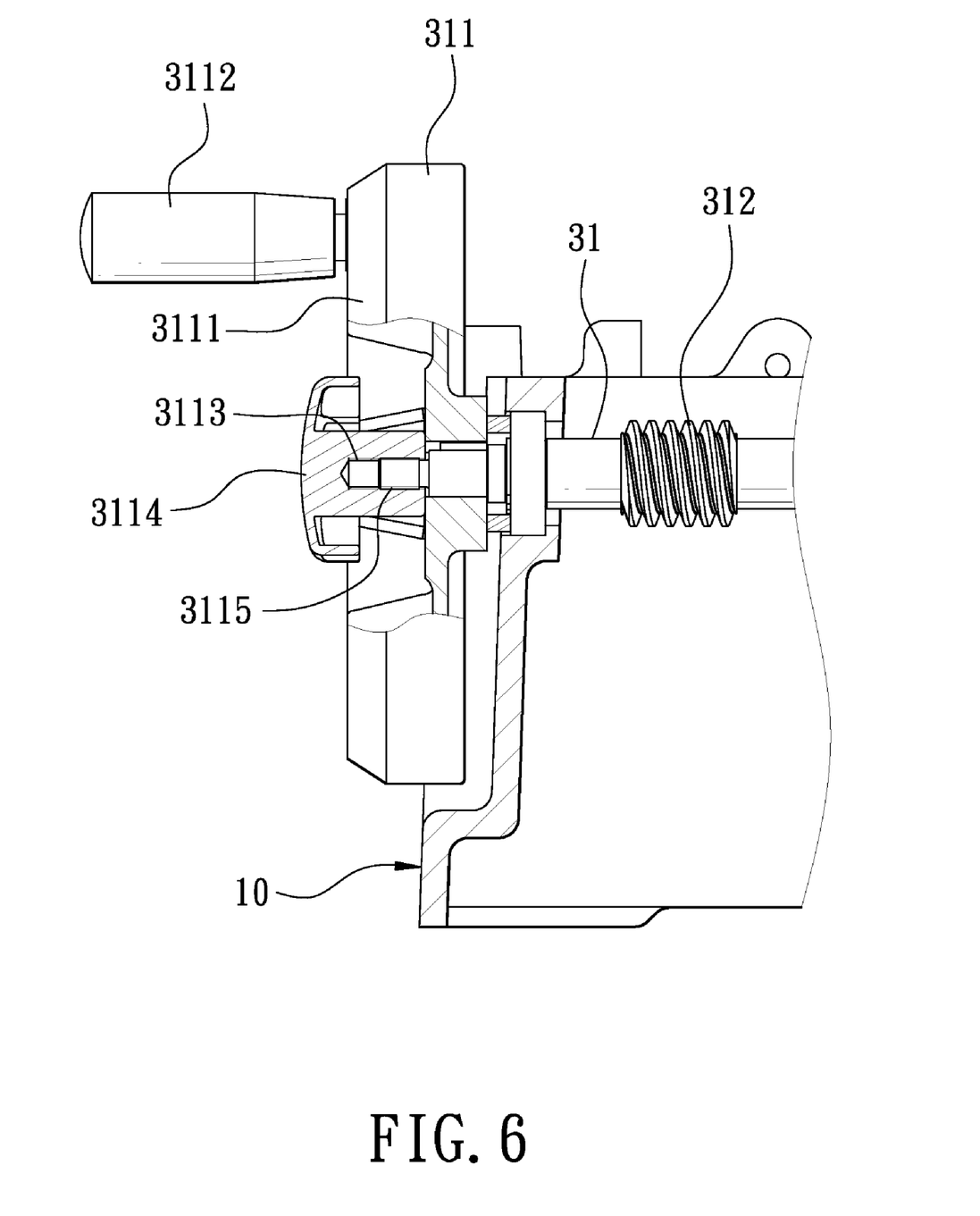
FIG. 6 is a side cross-sectional view of the first preferred embodiment showing a locking button secured with the driving shaft in the present invention.

The driving shaft 31 has its front end provided with an operating member 311 composed of a rotary wheel 3111 and a handle 3112 pivotally fixed on the rotary wheel 3111 for a user to hold thereon and carry out adjusting of the movable worktable 20. Referring to FIGS. 3 and 6, the driving shaft 31 is provided with a threaded section 3113 at one end. A locking button 3114 has a threaded hole 3115 formed therein for securing the threaded section 3113 of the driving shaft to let the inner end of the locking button 3114 tightly pressed on the outer side of the rotary wheel 3311 for securing the rotary wheel 3111 against the driving shaft. The driving shaft 31 has its front end inserted through the insert hole 11 of the base 10 and the rear side of the front end of the driving shaft 31 is provided with a first driving gear 312 in the structure of a worm.

The driven shaft 32 is positioned under the driving shaft 31 and vertically intersecting with the driving shaft 31. The driven shaft 32 has one side provided with a first driven gear 321 made of a worm gear at a location corresponding to the first driving gear 312 of the driving shaft 31, with the first driven gear 321 engaged with the first driving gear 312. The driven shaft 32 has the other side provided with a second driving gear 322 made of a worm.

The rotary base 33 is to be assembled on the second driving gear 322 of the driven shaft 32, having its bottom disposed with a second driven gear 331 made of a sector of a worm gear to match with the second driving gear 322 of the driven shaft 32 so that the second driven gear 331 and the second driving gear 322 can be engaged with each other. Further, the rotary base 33 has its topside formed with a rotary member 332 axially bored with an insert hole 3321, a first through hole 333 between the second driven gear 331 and the insert hole 3321, and a second through hole 334 between the insert hole 3321 and the first through hole 333.

The connecting rod base 34 is bored with a threaded hole 341 at a location corresponding to the second through hole 334 of the rotary base 33, secured at the front side of the rotary base 33 by means of a screw 342. The connecting rod base 34 has its upper side axially bored with a combining through hole 343 at a location matching with the insert hole 3321 of the rotary base 33 and a through shaft hole 344 at a location tallying with the first through hole 333 of the rotary base 33. The movable worktable 20 is axially assembled on the topside of the connecting rod base 34. In addition, the connecting rod base 34 has its central opposite sides respectively and longitudinally fixed thereon with a positioning block 345 at a location matching with the movable worktable 20. The positioning block 345 has its upper side formed with a slope of 45 degrees for restricting the movable worktable 20 to move upward or downward within 45 degrees.

The assembly rod 35 is to be axially inserted through both the insert hole 3321 of the rotary base 33 and the combining hole 343 of the connecting rod base 34, having its opposite ends respectively provided with threads 351 secured thereon with a nut 352 for fixing the assembly rod 35 at the upper sides of the rotary base 33 and the connecting rod base 34. The assembly rod 35 is also inserted through the opposite sides of the movable worktable 20 so as to push and actuate the movable worktable 20 to move upward and downward along the rotation movement of the connecting rod base 34.

The spindle 36 is axially inserted through the first through hole 333 of the rotary base 33 and secured in the shaft hole 344 of the connecting rod base 34.

Figure 4:
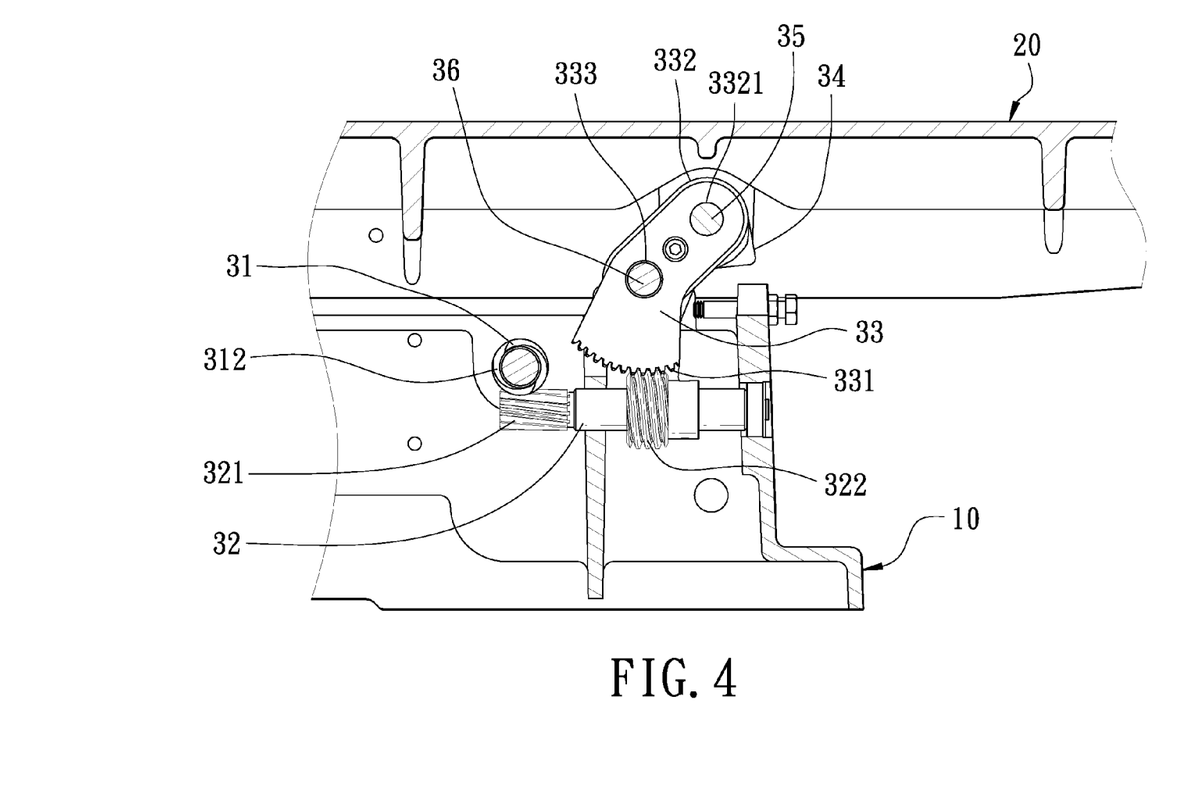
FIG. 4 is a cross-sectional view of the first preferred embodiment of the elevating device in a condition showing the movable worktable in a lower position.
Figure 5:
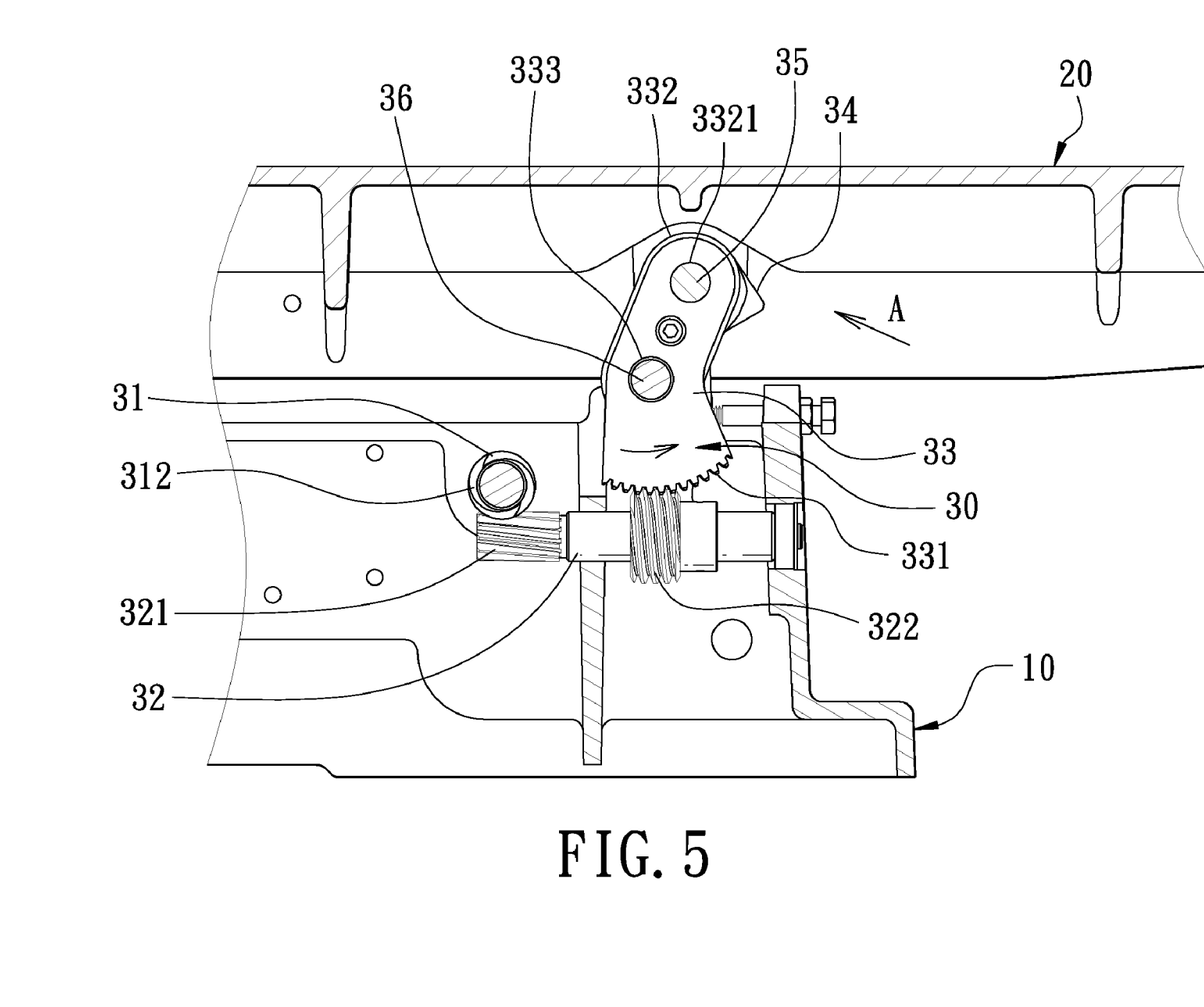
FIG. 5 is a cross-sectional view of the first preferred embodiment of the elevating device showing the second driven gear being rotated so that the movable worktable being adjusted in a higher position.

In operations, it is referred to FIG. 3 and better reference to FIGS. 4 and 5, First, the handle 3112 of the operating member 311 is turned to drive the rotary wheel 3111 and the driving gear 312 to rotate synchronously, The driving gear 312 of the driving shaft 31 engaged with the driven gear 321 of the driven shaft 32, will actuate the driven shaft 32 to rotate. Simultaneously, the second driven gear 331 of the rotary base 33, engaged with the second driving gear 322 of the driven shaft 32, will be driven to rotate by the second driving gear 322, and the rotary member 332 and the second driven gear 331 of the rotary base 33 will be rotated relatively with the spindle 36 acting as a pivot. When the rotary member 332 of the rotary base 33 is rotated with respect to the spindle 36, the connecting rod base 34 secured with the rotary base 33 by the assembly rod 35 will be synchronously driven to operate, and the movable worktable 20 axially assembled on the connecting rod base 34 will be actuated to move upward or downward. As shown in FIGS. 4 and 5, the second driven gear 331 shall be actuated by secured driving gear 322. The worktable 20 shall be moved along the direction of arrow A.

Figure 7:
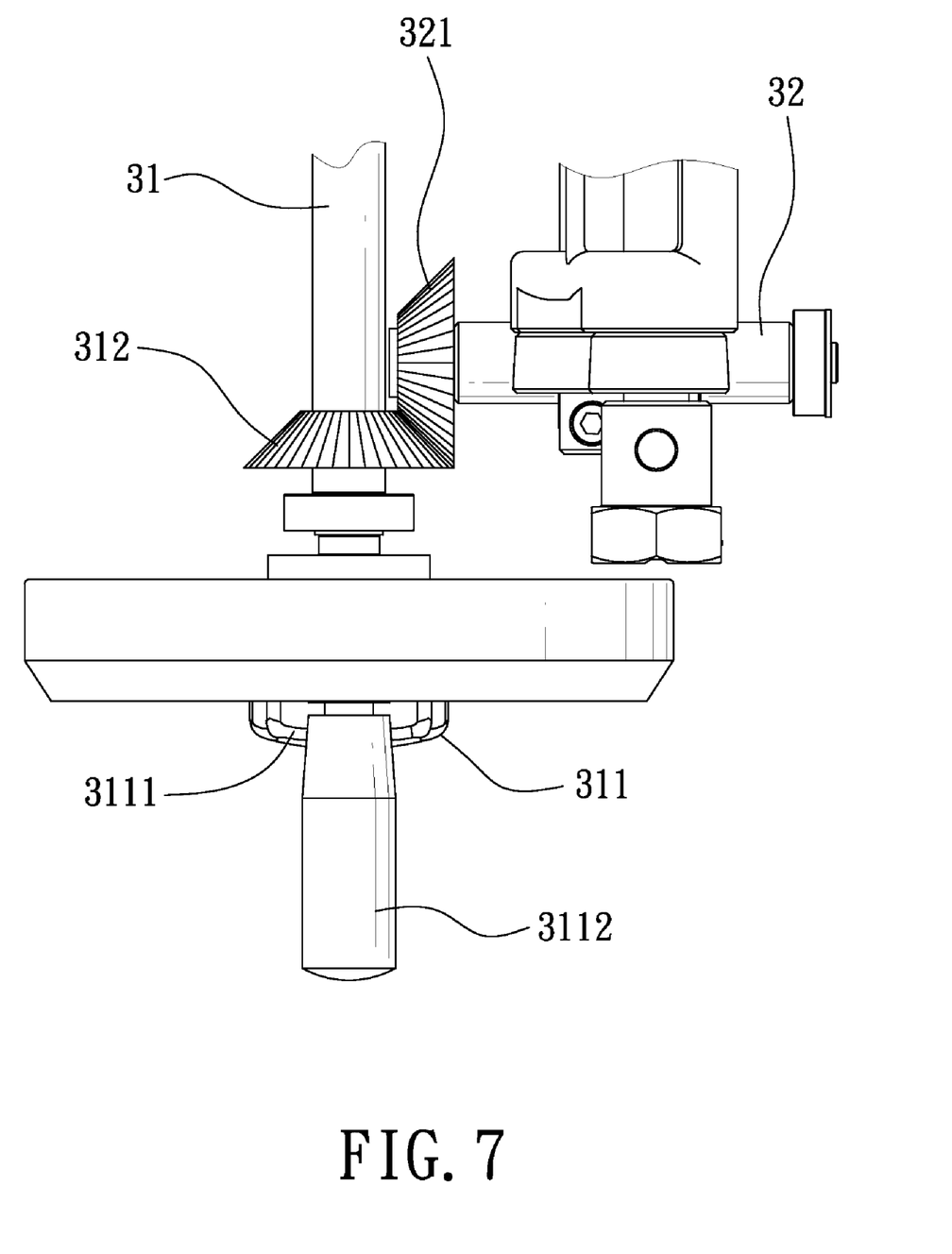
FIG. 7 is a perspective view of a second preferred embodiment of an elevating device for the worktable of a manual planer in the present invention.

Referring to FIG. 7 which shows an elevation view of a second preferred embodiment of an elevating device for the worktable of a manual planer in the present invention. The elevating device has almost the same structure and function as those described in the first preferred embodiment, except that the driving gear 312 of the driving shaft 31 and the first driven gear 321 of the driven shaft 32 are made of a pair of baffle gears. The driving gear 312 is engaged with the first driven gear 321 for driving the driven shaft 32 to rotate. And in turn by interaction actuation, the movable worktable 20 shall move upward or downward.

Figure 8:
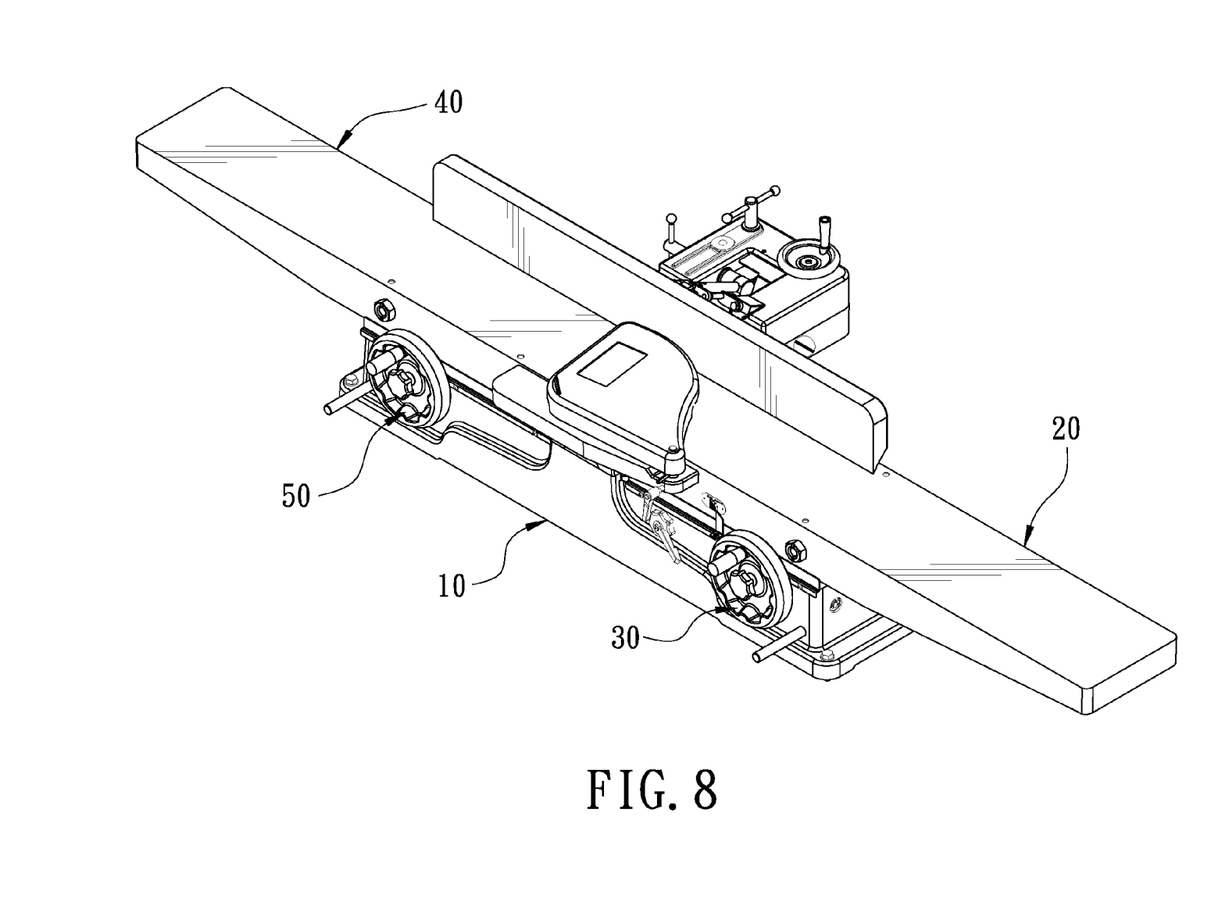
FIG. 8 is a perspective view of a third preferred embodiment of an elevating device for the worktable of a manual planer in the present invention.

FIG. 8 shows a third preferred embodiment of an elevating device for worktable of a manual planer in the present invention. The manual planer has almost the same structure and function as those described in the first preferred embodiment, except that the base 10 has its left side an additional second movable worktable 40 and a second elevating device 31 for adjusting the position of the second movable worktable 50.

Evidently, the elevating device for the worktable of a manual planer in the present invention is simple in structure and able to adjust the position of the worktable of a manual planer with only one step operation, and the operating member of the driving shaft can be operated with less force, convenient in use. Additionally, the worktable of the manual planer can be quickly and accurately adjusted and fixed in position by the elevating device of this invention.

While the preferred embodiments of the invention have been described above, it will be recognized and understood that various modifications may be made therein and the appended claims are intended to cover all such modifications that may fall within the spirit and scope of the invention.

I claim:

1. An elevating device for a worktable of a manual planer comprising:
   a base;
   a movable worktable slidably assembled at one end of said base;
   said elevating device comprises of a driving shaft, a driven shaft, a rotary base, a connecting rod base, an assembly rod, and a spindle;
   said driving shaft axially and pivotally inserted in said base;
   said driving shaft being fixed with an operating member at one end corresponding to said base;
   said driving shaft being provided with a driving gear at one side opposite to said operating member;
   said driven shaft vertically intersecting with said driving shaft;
   said driven shaft being disposed with a first driven gear at one side corresponding to said driving gear of said driving shaft and a second driving gear at another side of said driven shaft;
   said rotary base being provided with a second driven gear to match with said second driving gear of said driven shaft;
   said connecting rod base being secured at a rear side of said rotary base by said assembly rod;
   said spindle axially being inserted through said rotary base and being fixed in said connecting rod base;
   said operating member of said driving shaft being operated to let said driving gear driving said first driven gear of said driven shaft to rotate;
   said second driving gear of said driven shaft being rotated to actuate said second driven gear of said rotary base to rotate;
   said rotary base with said spindle acting as a pivot and being actuated to carry out relative rotation and to actuate said connecting rod base to operate; and
   said movable worktable on said connecting rod base being actuated to move upward or downward together with said connecting rod base.

2. The elevating device for worktable of a manual planer as claimed in claim 1, wherein said rotary base is assembled on said second driven gear of said driven shaft, and said third driven gear formed at a bottom of said rotary base is engaged with said second driven gear for mutual transmission, said rotary base having a topside formed with a rotary member, said rotary member axially bored with an insert hole and a first through hole at a longitudinal location between said third driven gear and said insert hole, said rotary base further bored with a second through hole between said insert hole and said first through hole, said connecting rod base axially bored with a combining hole and a shaft hole respectively corresponding to said insert hole and said first through hole of said rotary base, said combining shaft axially inserted through both said insert hole of said rotary base and said combining hole of said connecting rod base, said combining shaft having opposite sides respectively engaged with a nut for securing said combining shaft at upper sides of said rotary base and said connecting rod base, said spindle axially inserted through said first through hole of said rotary base and fixed in said shaft hole of said connecting rod base.

3. The elevating device for the worktable of a manual planer as claimed in claim 1, wherein said driving gear of said driving shaft is made of a worm, while said first driven gear of said driven shaft is made of a worm gear.

4. The elevating device for the worktable of a manual planer as claimed in claim 1, wherein said second driving gear of said driving shaft is made of a baffle gear, while said second driving gear of said driven shaft is correspondingly made of a baffle gear.

5. The elevating device for the worktable of a manual planer as claimed in claim 1, wherein said second driven gear of said driving shaft is made of a worm, while said second driven gear of said rotary base is correspondingly made of a worm gear.

6. The elevating device for worktable of a manual planer as claimed in claim 1, wherein said operating member of said driving shaft is composed of a rotary wheel and a handle pivotally fixed on said rotary wheel to be held for carrying out adjusting of said movable worktable.

7. The elevating device for the worktable of a manual planer as claimed in claim 1, wherein said driving shaft is provided with a threaded section at one side of said rotary wheel, and a locking button having a threaded inner bore being secured thereon to enable an inner end of said locking button to be tightly secured on said threaded section for stopping said rotary wheel from rotating.

8. The elevating device for the worktable of a manual planer as claimed in claim 1, wherein said connecting rod base has central opposite sides respectively and longitudinally fixed with a positioning block corresponding to said movable worktable and each said positioning block has a topside formed with a slope of 45 degrees for restricting said movable worktable to be moved upward or downward within 45 degrees.

* * * * *